United States Patent
Woo et al.

(10) Patent No.: US 12,510,579 B2
(45) Date of Patent: Dec. 30, 2025

(54) CONTACTLESS DC ELECTRIC-FIELD SENSOR

(71) Applicant: KOREA ELECTROTECHNOLOGY RESEARCH INSTITUTE, Changwon-si (KR)

(72) Inventors: Jeong Min Woo, Changwon-si (KR); Sung Man Kang, Changwon-si (KR); Jae Bok Lee, Changwon-si (KR); Mun No Ju, Changwon-si (KR)

(73) Assignee: KOREA ELECTROTECHNOLOGY RESEARCH INSTITUTE, Changwon-si (KR)

(*) Notice: Subject to any disclaimer, the term of this patent is extended or adjusted under 35 U.S.C. 154(b) by 211 days.

(21) Appl. No.: 18/453,740

(22) Filed: Aug. 22, 2023

(65) Prior Publication Data
US 2024/0094276 A1 Mar. 21, 2024

(30) Foreign Application Priority Data
Sep. 20, 2022 (KR) .................... 10-2022-0118453

(51) Int. Cl.
*G01R 29/12* (2006.01)

(52) U.S. Cl.
CPC ................. *G01R 29/12* (2013.01)

(58) Field of Classification Search
CPC ........ G01R 29/12; G01R 15/18; G01R 19/12; G01R 19/16528; G01R 19/22; G01R 19/30; G01R 27/2605
USPC ......................................................... 324/457
See application file for complete search history.

(56) References Cited

U.S. PATENT DOCUMENTS

| | | | | |
|---|---|---|---|---|
| 4,796,013 A | * | 1/1989 | Yasuda | H01H 3/141 340/562 |
| 9,664,721 B1 | | 5/2017 | Noras | |
| 2005/0122115 A1 | * | 6/2005 | Maguire | G01R 33/345 324/322 |
| 2011/0259953 A1 | * | 10/2011 | Baarman | G01G 7/00 235/375 |
| 2012/0299604 A1 | | 11/2012 | Waugaman et al. | |
| 2018/0004298 A1 | * | 1/2018 | Liu | H03K 17/9542 |
| 2018/0136260 A1 | * | 5/2018 | Rodriguez | G01R 19/0092 |
| 2018/0331575 A1 | * | 11/2018 | Ikefuji | H02J 50/12 |

FOREIGN PATENT DOCUMENTS

| | | |
|---|---|---|
| JP | H11287833 A | 10/1999 |
| JP | 2005214760 A | 8/2005 |
| JP | 2007147419 A | 6/2007 |
| KR | 20080080334 A | 9/2008 |
| KR | 10-2018-0118298 A | 10/2018 |

OTHER PUBLICATIONS

Iannacci, Jacopo. "RF MEMS passive components for wireless applications." Handbook of MEMS for wireless and mobile applications. Woodhead Publishing, 2013. 100-135. (Year: 2013).*
Park, Jongyoon. "A Field-Deployable Quartz Crystal Microbalance System for Gas Detection." (2022). (Year: 2022).*

* cited by examiner

*Primary Examiner* — Christopher P Mcandrew
(74) *Attorney, Agent, or Firm* — Seed Intellectual Property Law Group LLP

(57) ABSTRACT

Disclosed herein is a contactless DC electric-field sensor having improved sensitivity. The contactless DC electric-field sensor has a circuit composed of a variable capacitor and an RF generator and improves sensitivity through resonance of the circuit by connecting an inductor to the sensor.

7 Claims, 4 Drawing Sheets

CONTACTLESS DC ELECTRIC-FIELD SENSOR

TECHNICAL FIELD

The present invention relates to a contactless DC electric-field sensor, more particularly to a contactless DC electric-field sensor that has a circuit composed of a variable capacitor and an RF generator and achieves improvement in sensitivity through resonance of the circuit by connecting an inductor to the circuit of the electric-field sensor.

BACKGROUND

In recent years, with increasing risks of DC electric field exposure due to construction of high-voltage direct current (HVDC) transmission lines and growing demand for DC-powered electric vehicles, there is an increasing need for DC electric-field sensors. Accordingly, various DC electric-field sensors including capacitively inductive electrometers, rotatable electrode type electrometers, semiconductor-based electrometers, and the like are developed and used in the art.

More specifically, the capacitively inductive electrometer measures an electric field by connecting a conductor plate to a grounded capacitor to measure voltage between the conductor plate and an object to be measured, followed by calibration of the voltage. The capacitively inductive electrometer has the following problems: the capacitively inductive electrometer requires calibration every few minutes to measure a distance to the object to be measured, can measure the object only within a short distance, cannot measure an external electric field for a long period of time, and requires reset operation every 20 minutes to release charges accumulated in the capacitor. The rotatable electrode type electrometer measures an electric field by moving charges on electrodes according to rotation of a shutter to convert an existing DC signal into an AC signal, followed by differentiating an output signal of triangular waves of induced charges with time to detect an induced current waveform. The rotatable electrode type electrometer requires electric power to drive a motor for rotating the shutter, has limited measurement speed due to the limited number of motor revolutions, has a large volume, and often malfunctions due to introduction of foreign matter into the rotational electrode during long-term operation.

In order to reduce malfunction and measurement errors due to foreign matter in the rotational electrode upon long-term operation while securing high sensitivity and wide measurement ranges of the rotatable electrode type electrometer, a semiconductor-based DC electrometer using electronic devices has been developed in the art. A typical semiconductor-based DC electrometer (for example, US Patent Publication No. 2012/0299604 (Nov. 29, 2012)) includes a circuit composed of a variable capacitor and a signal generator and measures voltage of an object to be measured based on the magnitude of electric current flowing in the circuit depending upon capacitance of the variable capacitor generated by an electric field of the object to be measured. However, variation in magnitude of the electric field flowing in the circuit is small due to small variation in capacitance of the variable capacitor resulting from variation in electric field of the object to be measured, thereby causing low sensitivity of the electrometer.

RELATED LITERATURE

Patent Document (Patent Document 1) US Patent Publication No. 2012/0299604 (Nov. 29, 2012)

SUMMARY

A conventional rotatable electrode type electrometer requires electric power to drive a motor for rotating the shutter and often malfunctions due to foreign matter entering the rotational electrode during long-term operation, and a conventional semiconductor-based DC electrometer has a problem of low sensitivity due to a small variation in capacitance of a voltage controlling capacitor generated by an electric field of an object to be measured.

It is an aspect of the present invention to provide a contactless DC electric-field sensor that secures high sensitivity and a wide measurement range, and can reduce malfunction and measurement errors due to foreign matter upon operation for a long period of time while overcoming low sensitivity due to a small variation in capacitance of a voltage controlling capacitor.

In accordance with one aspect of the present invention, a contactless DC electric-field sensor includes: a sensor plate to which a DC electric field generated by an object to be measured is applied; a variable capacitor having a capacitance value varying depending upon the magnitude of voltage of the DC electric field applied to the sensor plate; an inductor connected in series to the variable capacitor to form a resonance circuit; an RF generator supplying sinusoidal AC power having a constant amplitude and frequency to the variable capacitor; and a measurement unit measuring the magnitude of alternating electric current flowing through the resonance circuit according to a resonance frequency and a capacitance value determined according to the magnitude of voltage of the DC electric field applied to the sensor plate and calculating the DC electric field based on the measured magnitude of the alternating electric current.

In one exemplary embodiment, the magnitude of the alternating electric current flowing through the resonance circuit may be calculated based on the capacitance value of the variable capacitor determined according to the DC electric field generated by the object to be measured, the resonance frequency of the resonance circuit depending upon the determined capacitance value, and the frequency of the AC power supplied from the RF generator.

In one exemplary embodiment, the magnitude of the alternating electric current measured by the measurement unit may be a peak-to-peak value of the alternating electric current.

In one exemplary embodiment, the inductor may be connected in parallel to the variable capacitor.

In one exemplary embodiment, the magnitude of the alternating electric current may be measured at least partially based on a difference between the resonance frequency of the resonance circuit and an inherent frequency of the AC power.

In one exemplary embodiment, the measurement unit may include: an AC galvanometer connected to the resonance circuit and measuring the magnitude of the alternating electric current flowing through the resonance circuit; and a controller calculating the DC electric field based on the measured magnitude of the alternating electric current.

In one exemplary embodiment, the variable capacitor may include one or more variable capacitors having a common cathode and the sensor plate may be connected to the common cathode of the variable capacitors.

In one exemplary embodiment, the variable capacitor may be a Varactor.

In one exemplary embodiment, the contactless DC electric-field sensor may further include a 1:1 transformer disposed between the RF generator and the resonance circuit and supplying the AC power received from the RF generator to the resonance circuit.

The contactless DC electric-field sensor according to the present invention can reduce malfunction and errors in measurement of an electric field generated from a non-rotatable external electrode by measuring variation in electric current according to capacitance of a variable capacitor varied by the electric field generated from the external electrode, can be easily connected to an existing IC circuit, can achieve size reduction, and can improve sensitivity by increasing variation of alternating electric current flowing in the electric-field sensor depending upon a difference between a resonance frequency and an inherent frequency of an RF generator supplied to a circuit of the electric-field sensor through resonance of the circuit using an inductor connected to the variable capacitor.

BRIEF DESCRIPTION OF THE DRAWINGS

The above and other aspects, features, and advantages of the present invention will become apparent from the detailed description of the following embodiments in conjunction with the accompanying drawings.

DETAILED DESCRIPTION OF EMBODIMENTS

Hereinafter, exemplary embodiments of the present invention will be described with reference to the accompanying drawings. It should be understood that the present invention is not limited thereto and may be embodied in different ways. The following embodiments are provided for complete disclosure and thorough understanding of the present invention by those skilled in the art.

Figure 1:
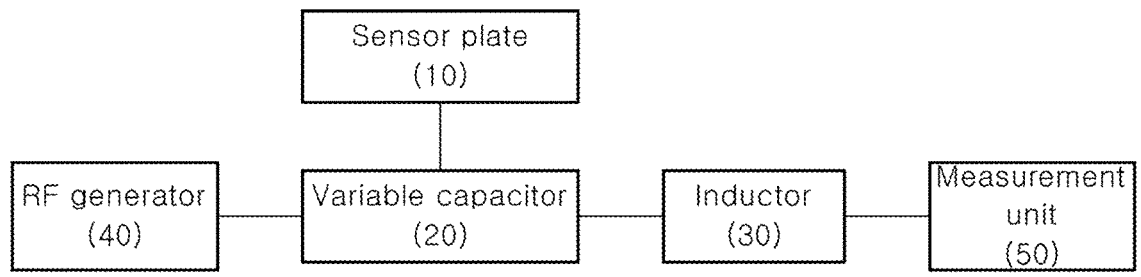
FIG. 1 is a schematic block diagram of a contactless electric-field sensor according to one embodiment of the present invention.
Figure 2:
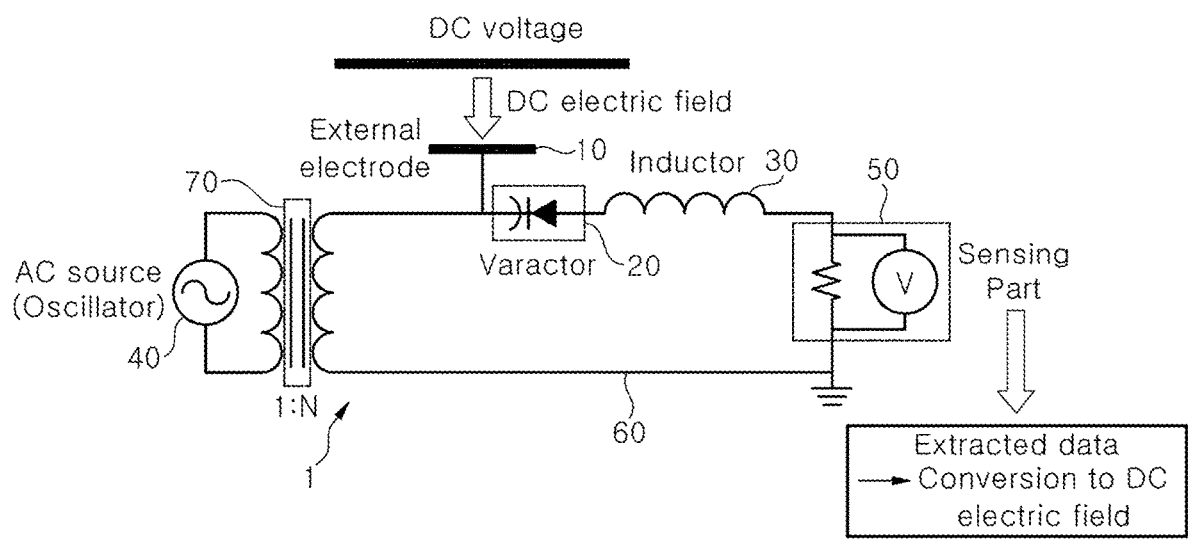
FIG. 2 is a schematic circuit diagram of the contactless electric-field sensor according to the embodiment of the present invention.

First, FIG. 1 is a schematic block diagram of a contactless electric-field sensor according to an embodiment of the present invention and FIG. 2 is a schematic circuit diagram of the contactless electric-field sensor according to the embodiment of the present invention. Hereinafter, a contactless electric-field sensor according to one embodiment of the present invention will be described in detail with reference to FIG. 1 and FIG. 2.

Referring to FIG. 1, the contactless electric-field sensor 1 according to the embodiment may include a sensor plate 10, a variable capacitor 20, an inductor 30, an RF generator 40, and a measurement unit 50.

First, the sensor plate 10 is configured to receive a DC electric field generated by an object to be measured. That is, the sensor plate 10 may act as a kind of electrode receiving voltage due to an external electric field. As shown in FIG. 1, the sensor plate 10 may be connected to the variable capacitor 20 to deliver voltage due to the external electric field generated by the object to the variable capacitor 20. Although FIG. 2 shows the sensor plate 10 with this structure, it should be understood that the sensor plate 10 may be modified into various shapes so long as the sensor plate can receive an external voltage due to an external electric field.

The variable capacitor 20 is connected to the sensor plate 10 and has a capacitance value varying depending upon the magnitude of an external voltage generated by the object applied to the sensor plate 10. In one exemplary embodiment, the variable capacitor 20 may be realized by a Varactor. As known in the art, a Varactor is a semiconductor-based variable capacitance diode having variable capacitance depending upon voltage applied thereto. However, the variable capacitor 20 according to the present invention is not limited thereto and may be realized by various semiconductor-based devices having variable capacitance depending upon the voltage applied thereto.

Referring to FIG. 2, the variable capacitor 20 according to the present invention is realized by one or more variable capacitors, in which the sensor plate 10 is connected to a common node of the variable capacitors.

According to the present invention, the inductor 30 is connected in series or in parallel to the variable capacitor 20 to form an LC resonance circuit 60. Accordingly, the LC resonance circuit 60 has a resonance frequency determined depending upon capacitance of the variable capacitor 20 and inductance of the inductor 30. As described above, since capacitance of the variable capacitor 20 varies depending upon the magnitude of external voltage applied thereto, the resonance frequency of the LC resonance circuit 60 varies depending upon the magnitude of external voltage applied to the variable capacitor 20.

That is, since capacitance of the variable capacitor 20 is determined according to the magnitude of the external voltage generated by the object to be measured, the resonance frequency of the LC resonance circuit 60 also varies.

According to the present invention, the contactless electric-field sensor 1 is clearly distinguished in terms of constitution and advantageous effects from the semiconductor-based DC electrometer (US Patent Publication No. 2012/0299604 (Nov. 29, 2012)) described above in that the LC resonance circuit 60 is formed by connecting the inductor 30 to the variable capacitor 20 to induce resonance of a circuit of the contactless electric-field sensor. As described above, since the variable capacitor allows a very small variation in capacitance depending upon external voltage, the semiconductor-based DC electrometer has a problem of low measurement sensitivity due to a very small variation in magnitude of electric current flowing through the variable capacitor. In order to solve the problem in the art, the contactless electric-field sensor 1 according to the present invention is constituted by connecting the inductor 30 to the variable capacitor 20 so as to form the LC resonance circuit 60 for induction of resonance. That is, the present invention uses a concept that, as a resonance frequency of the LC resonance circuit 60 formed by the variable capacitor 20 and the inductor 30 approaches an inherent frequency of AC power supplied to the circuit, the magnitude of electric current flowing through the LC resonance circuit 60 is increased by a resonance effect. Improvement in measurement sensitivity of the contactless electric-field sensor 1 according to the present invention will be described with reference to FIG. 3A and FIG. 3B.

Although FIG. 2 shows series connection between the variable capacitor 20 and the inductor, the variable capacitor 20 may be connected in parallel to the inductor 30 to form the resonance circuit in another embodiment. In addition, although the resonance circuit 60 is illustrated as being constituted by the variable capacitor 20 and the inductor 30, it will be apparent to those skilled in the art that various devices used in the art may be added to form the resonance circuit.

The RF generator 40 according to the embodiment is configured to supply an RF signal having a constant amplitude and frequency to the variable capacitor 20 and the inductor 30. When the RF signal is supplied from the RF generator 40 to the variable capacitor 20 and the inductor 30, alternating electric current flows through the LC resonance circuit 60.

In addition, the contactless electric-field sensor 1 according to the embodiment may further include a transformer 70. The transformer 70 is disposed between the RF generator 40 and the resonance circuit 60 to supply AC power received from the RF generator 60 to the resonance circuit 60. According to one exemplary embodiment, the transformer 70 may be an insulating transformer or a 1:1 transformer. In this case, the RF generator 40 is electrically separated from the resonance circuit, thereby preventing malfunction while further improving measurement accuracy.

According to the present invention, the measurement unit 50 may measure alternating electric current flowing through the variable capacitor 20 and the inductor 30 (that is, the resonance circuit 60) and may determine a DC electric field generated by an object to be measured based on the measured magnitude of the alternating electric current.

In one exemplary embodiment, the measurement unit 50 may include: an AC galvanometer 51 connected to the resonance circuit 60 and measuring the magnitude of the alternating electric current flowing through the resonance circuit 60; and a controller 52 calculating the DC electric field based on the measured magnitude of the alternating electric current. As shown in FIG. 2, the AC galvanometer 51 may include a resistor connected in series to the resonance circuit 60. The controller 52 may calculate the DC electric field of the object to be measured through amplification and demodulation of the alternating electric current measured by the AC galvanometer 51.

In one exemplary embodiment, the measurement unit 50 may measure a peak-to-peak value of the alternating electric current flowing through the resonance circuit 60 to determine the DC electric field of the object to be measured based on the peak-to-peak value of the measured alternating electric current. More specifically, in one exemplary embodiment of the invention, the magnitude of the electric current (for example, a peak-to-peak value of the electric current) flowing through the resonance circuit 60 is determined based on capacitance of the variable capacitor determined according to the DC electric field of the object to be measured, inductance of the inductor 30, a resonance frequency of the resonance circuit 60 determined based on the determined capacitance and the inductance, an inherent frequency of AC power supplied from the RF generator 40, and voltage. In particular, the magnitude of the AC electric current flowing through the resonance circuit 60 may be at least partially based on a difference between the resonance frequency of the resonance circuit 60 and the frequency of the AC power.

That is, as described above, when the resonance frequency determined based on the capacitance of the variable capacitor 20 according to an external voltage generated by the object to be measured is coincident with the frequency of the RF signal supplied from the RF generator 40, the magnitude of the alternating electric current flowing through the LC resonance circuit 60 becomes the maximum value.

On the other hand, the magnitude of the alternating electric current flowing through the LC resonance circuit 60 decreases with increasing difference between the resonance frequency determined based on the capacitance of the variable capacitor 20 according to the external voltage due to the object to be measured and the frequency of the RF signal supplied from the RF generator 40.

Accordingly, the measurement unit 50 may measure the magnitude of the alternating electric current flowing through the LC resonance circuit 60 based on these points and may determine the external voltage applied to the variable capacitor 20 based on the magnitude of the alternating electric current and the above relationships. That is, since the inductance of the inductor 30 and the frequency and voltage of the AC power supplied by the RF generator 40 are known, the measurement unit 50 may determine a current capacitance value of the variable capacitor based on the measured magnitude of the alternating electric current and may determine the magnitude of the external voltage applied to the variable capacitor 20 based on feature data of the variable capacitor 20.

For example, the measurement unit 50 may store a calculation algorithm (or calculation equation) for calculation of an external voltage (and an external DC electric field resulting therefrom) from the measured magnitude of the alternating electric current. In this case, the measurement unit 50 may calculate and display the magnitude of the external DC electric field through application of the measured magnitude of the alternating electric current to the calculation algorithm. In addition, such a calculation algorithm (or calculation equation) may be realized by a calculation algorithm and a calculation equation known in the art. Accordingly, detailed description of the calculation algorithm and the calculation equation will be omitted.

Additionally or alternatively, the measurement unit 50 may store at least one of a graph, a table, data, and the like, which describe a relationship between the magnitude of the alternating electric current and the magnitude of the external DC electric field, and may determine the magnitude of the external DC electric field from the magnitude of the alternating electric current measured using such a graph, table, data, and the like. In these embodiments, the relationship between the magnitude of the alternating electric current and the magnitude of the external DC electric field may be determined empirically and/or experimentally. For example, in one exemplary embodiment, the measurement unit 60 may store a reference magnitude of alternating electric current in a state that the resonance frequency of the resonance circuit 60 is coincident with the frequency of AC power and a reference DC electric field corresponding to the reference magnitude of the alternating electric current, and may determine the magnitude of the DC electric field generated by the object to be measured based on the measured magnitude of the alternating electric current, the reference magnitude of the alternating electric current, and the reference DC electric field. In another embodiment, the measurement unit 50 may determine the corresponding magnitude of the DC electric field by applying the measured magnitude of the alternating electric current to the graph or the table stored therein.

However, it should be understood that the present invention is not limited to such a method of calculating/determining the magnitude of the external DC electric field and it will be apparent to those skilled in the art that the magnitude of the external DC electric field may be calculated and determined from the measured magnitude of the alternating electric current by various methods used in the art so long as the objects of the present invention can be achieved.

As described above, in the contactless electric-field sensor 1 according to the present invention, the variable capacitor 20 is connected to the inductor 30 to change the resonance frequency according to variation in capacitance of the variable capacitor 20 through resonance of the circuit of the electric-field sensor such that variation in magnitude of the alternating electric current flowing in the contactless electric-field sensor 1 increases depending upon a difference between the resonance frequency and an inherent frequency of the RF signal supplied from the RF generator 40, thereby providing an effect of improving measurement sensitivity. Effects relating to improvement in measurement sensitivity of the contactless electric-field sensor according to the prevent invention will be described in more detail with reference to FIG. 3A and FIG. 3B.

Figure 3A:
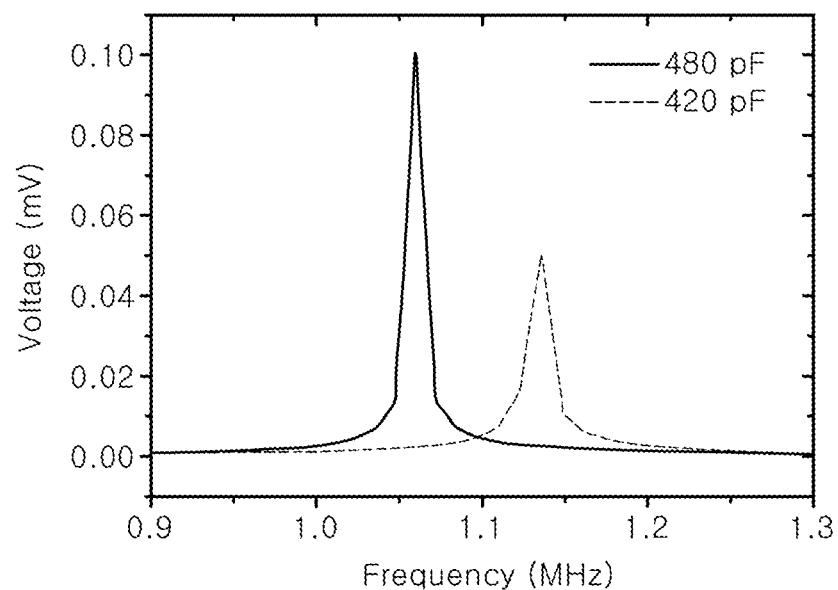
FIG. 3A and FIG. 3B are graphs depicting experimental results obtained using the contactless electric-field sensor according to the embodiment of the present invention.
Figure 3B:
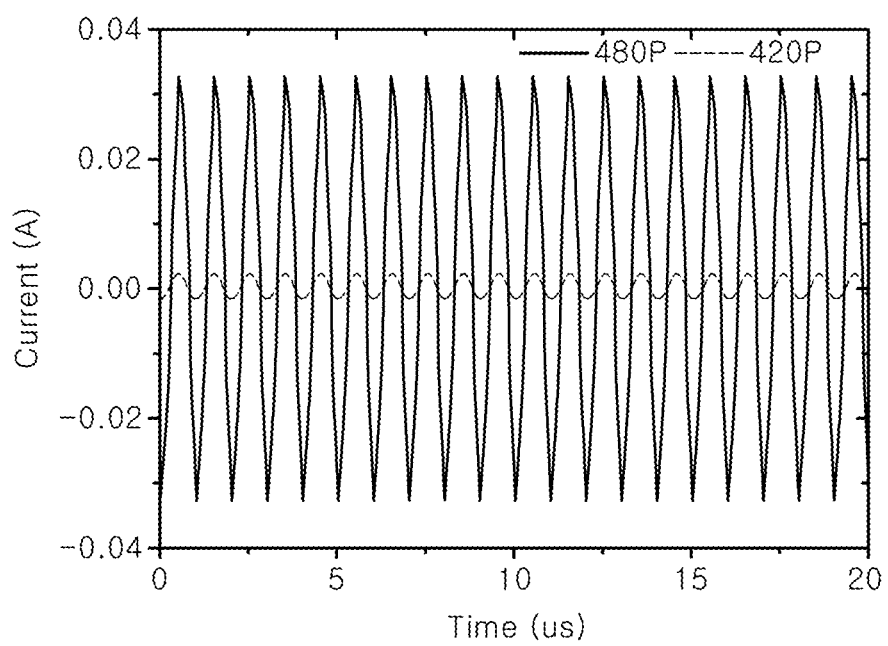

FIG. 3A and FIG. 3B show graphs depicting experimental results obtained using a particular embodiment of the contactless electric-field sensor 1 according to the present invention, in which the RF generator 40 supplies RF signals at an inherent frequency of 1 MHz and at an amplitude of 0.1 V.

FIG. 3A is a graph depicting resonance frequency of the LC resonance circuit 60 according to capacitance of the variable capacitor 20 when an external voltage due to an object to be measured is 0.6 V or 1.0 V.

In the graph of FIG. 3A, when the external voltage due to the object to be measured is 0.6 V, the variable capacitor 20 has a capacitance of 480 pF and the LC resonance circuit 60 has a resonance frequency of 1.05 MHz. When the external voltage is 1.0 V, the variable capacitor 20 has a capacitance of 420 pF and the LC resonance circuit 60 has a resonance frequency of 1.15 MHz.

The graph of FIG. 3A shows that variation in capacitance of the variable capacitor according to the magnitude of the external voltage of the object to be measured is insignificant.

FIG. 3B is a graph depicting the magnitude of alternating electric current flowing in the LC resonance circuit 60 according to capacitance of the variable capacitor 20 when the external voltage due to the object to be measured is 0.6 V or 1.0 V.

In the graph of FIG. 3B, upon resonance of the LC resonance circuit 60 through connection of the inductor 30 to the variable capacitor 20, when the external voltage due to the object to be measured is 0.6 V, the resonance circuit 60 has a resonance frequency of 1.05 MHz and the electric current measured by the AC galvanometer 51 has a peak-to-peak value of 66 mA.

When the external voltage due to the object to be measured is 1.0 V, the resonance circuit 60 has a resonance frequency of 1.15 MHz and the electric current measured by the AC galvanometer 51 has a peak-to-peak value of 4 mA.

When the external voltage due to the object to be measured is 0.6 V or 1.0 V, the variable capacitor 20 has a capacitance of 480 pF or 420 pF, indicating a small difference therebetween. However, the difference between the magnitudes of alternating electric current flowing in the circuit is large upon resonance of the LC resonance circuit 60.

Figure 4A:
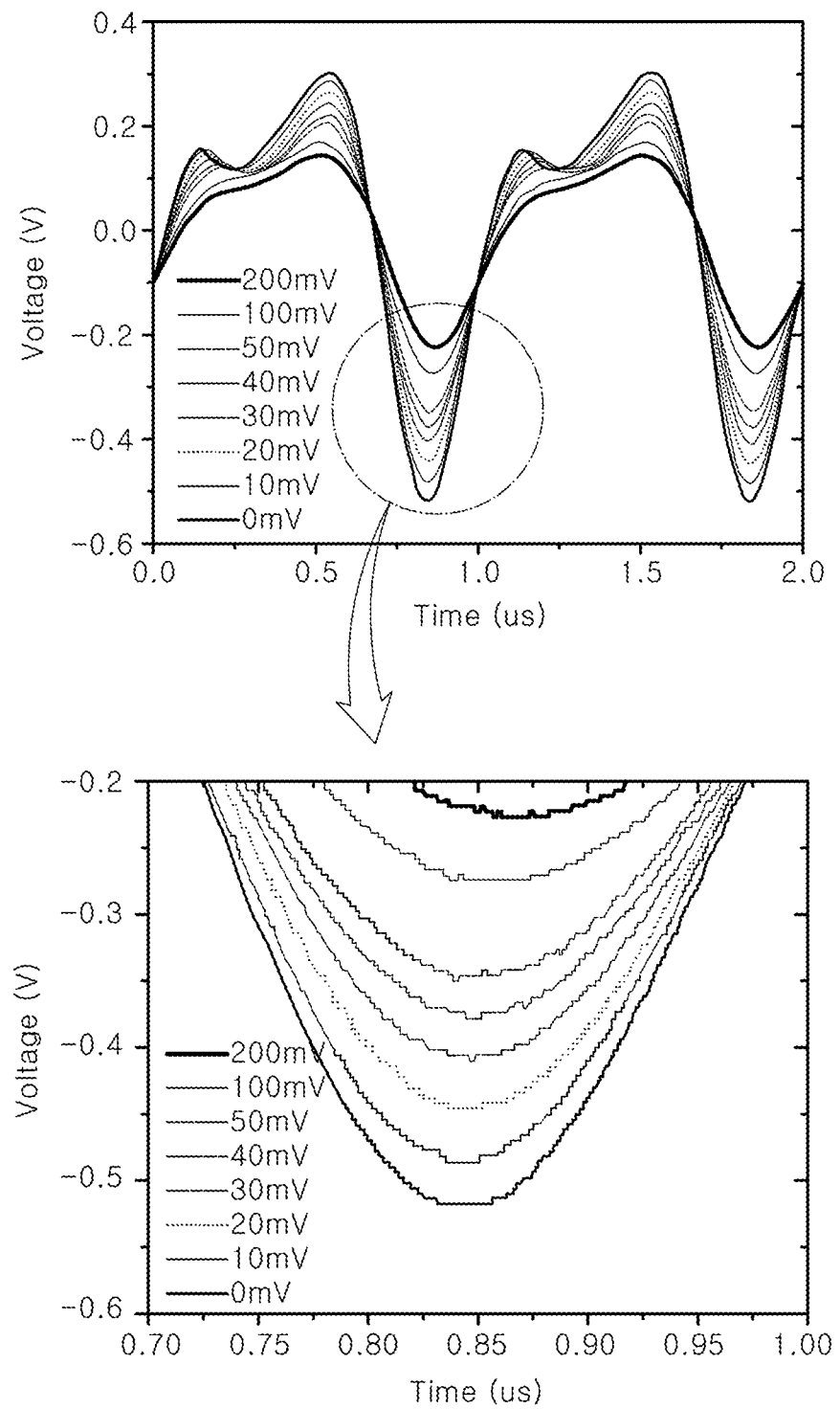
FIG. 4A is a graph depicting an experimental result depending upon variation in external voltage of an object to be measured, as obtained using the contactless electric-field sensor according to the embodiment of the present invention.

FIG. 4A is a graph depicting an experimental result obtained using a particular embodiment of the contactless electric-field sensor 1 according to the present invention, in which the RF generator 40 supplies RF signals at an inherent frequency of 1 MHz and at an amplitude of 0.8 V.

Figure 4B:
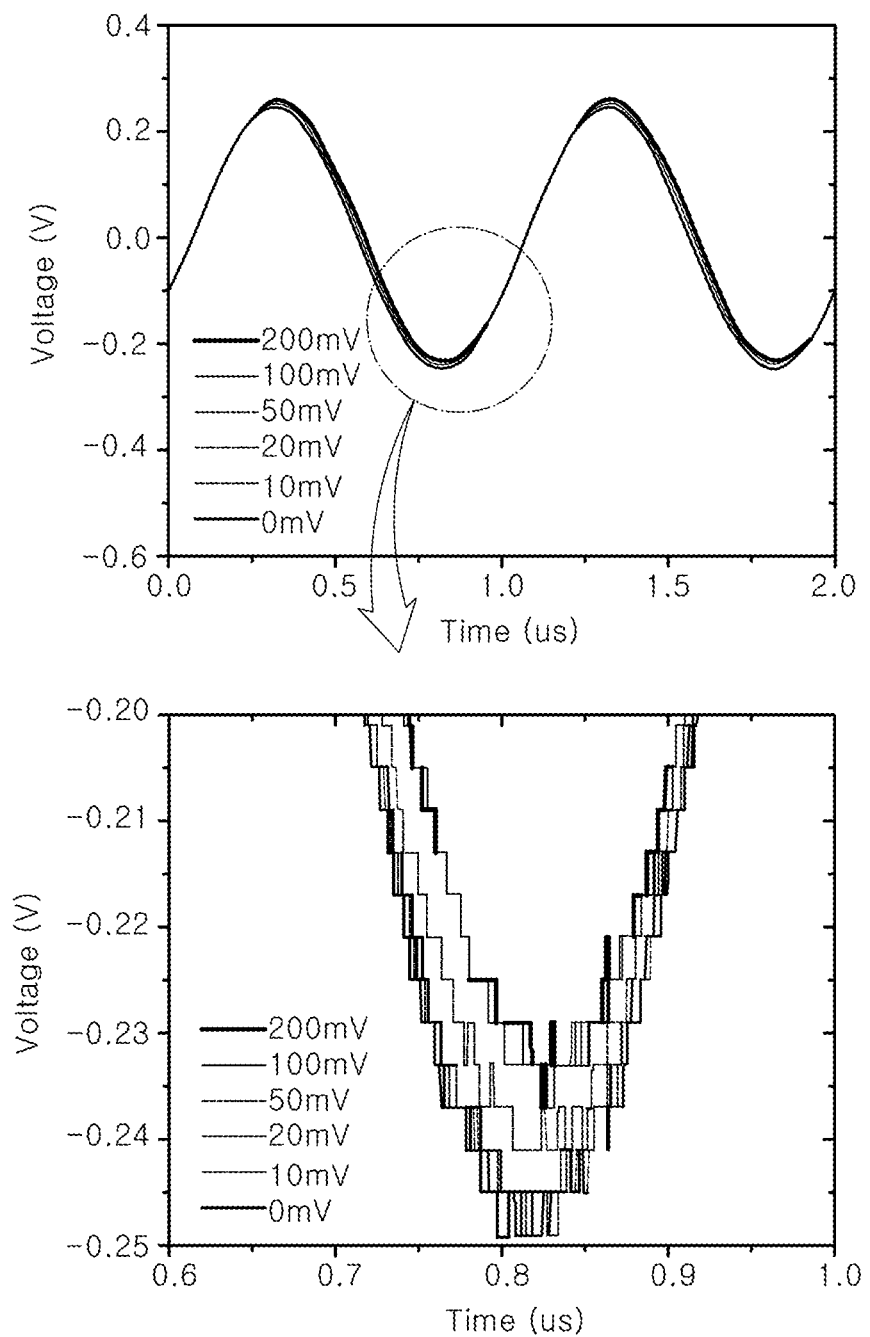
FIG. 4B is a graph depicting an experimental result depending upon variation in external voltage of an object to be measured, as obtained using a conventional contactless electric-field sensor.

FIG. 4B is a graph depicting an experimental result obtained using a particular embodiment of a conventional contactless electric-field sensor, in which the RF generator 40 supplies RF signals at an inherent frequency of 1 MHz and at an amplitude of 0.8 V and the inductor is not present.

A detailed difference between the contactless electric-field sensor according to the present invention and the conventional contactless electric-field sensor will be described based on the experimental results.

In the graph of FIG. 4A, upon resonance of the LC resonance circuit 60 through connection of the inductor 30 to the variable capacitor 20, the peak-to-peak value of alternating electric current flowing in the circuit was changed from 372 mV to 824 mV as the external voltage due to the object to be measured was changed from 0 mV to 10 mV, 20 mV, 30 mV, 40 mV, 50 mV, 100 mV, and 200 mV.

In the graph of FIG. 4B, for the electric-field sensor not including the inductor, even when the external voltage due to the object to be measured was changed from 0 mV to 200 mV, the peak-to-peak value of alternating electric current flowing in the circuit was changed from 489 mV to 492 mV, indicating a very small variation therebetween.

TABLE 1

| External voltage due to object to be measured | Electric-field sensor of the present invention including inductor | Typical electric-field sensor not including inductor |
| --- | --- | --- |
| 0 mV | 824 mV | 489 mV |
| 10 mV | 768 mV | 492 mV |
| 20 mV | 712 mV | 492 mV |
| 30 mV | 652 mV | — |
| 40 mV | 600 mV | — |
| 50 mV | 556 mV | 492 mV |
| 100 mV | 444 mV | 492 mV |
| 200 mV | 372 mV | — |

Table 1 summarizes peak-to-peak values of alternating electric current according to variation in external voltage due to an object to be measured using the contactless electric-field sensor according to the present invention including the inductor and the contactless electric-field sensor not including the inductor, as shown in FIG. 4A and FIG. 4B.

As such, in the contactless electric-field sensor 1 according to the present invention, the variable capacitor 20 is connected to the inductor 30 to form a resonance circuit such that variation in magnitude of alternating electric current generated by capacitance of the variable capacitor 20 becomes large according to the magnitude of an external voltage due to an object to be measured even with a small variation in external voltage, thereby improving sensitivity of the contactless electric-field sensor 1.

Although some embodiments have been described herein, it should be understood that these embodiments are given by way of illustration only and that various modifications, changes, and alterations can be made by those skilled in the art without departing from the spirit and scope of the present invention. Therefore, the scope of the invention should be limited only by the accompanying claims and equivalents thereto.

LIST OF REFERENCE NUMERALS

1: Contactless electric-field sensor
10: Sensor plate
20: Variable capacitor
30: Inductor
40: RF generator
50: Measurement unit
51: AC galvanometer
52: Controller
60: Resonance circuit
70: Transformer

The invention claimed is:

1. A contactless DC electric-field sensor, comprising:
a sensor plate to which a DC electric field generated by an object to be measured is applied;
a variable capacitor having a capacitance value varying depending upon the magnitude of voltage of the DC electric field applied to the sensor plate;
an inductor connected in series to the variable capacitor to form a resonance circuit;
an RF generator supplying sinusoidal AC power having a constant amplitude and frequency to the variable capacitor; and
a measurement unit measuring the magnitude of alternating electric current flowing through the resonance circuit according to a resonance frequency and a capacitance value determined according to the magnitude of voltage of the DC electric field applied to the sensor plate and calculating the DC electric field based on the measured magnitude of the alternating electric current,
wherein:
the magnitude of the alternating electric current flowing through the resonance circuit is calculated based on the capacitance value of the variable capacitor determined according to the DC electric field generated by the object to be measured, the resonance frequency of the resonance circuit depending upon the determined capacitance value, and the frequency of the AC power supplied from the RF generator; and
the measurement unit comprises:
an AC galvanometer connected to the resonance circuit and measuring the magnitude of the alternating electric current flowing through the resonance circuit, and
a controller calculating the DC electric field based on the measured magnitude of the alternating electric current.

2. The contactless DC electric-field sensor according to claim 1, wherein the magnitude of the alternating electric current is a peak-to-peak value of the alternating electric current.

3. The contactless DC electric-field sensor according to claim 1, wherein the inductor is connected in parallel to the variable capacitor.

4. The contactless DC electric-field sensor according to claim 1, wherein the magnitude of the alternating electric current is measured at least partially based on a difference between the resonance frequency of the resonance circuit and an inherent frequency of the AC power.

5. The contactless DC electric-field sensor according to claim 1, wherein the variable capacitor comprises two variable capacitors having a common cathode and the sensor plate is connected to the common cathode of the variable capacitors.

6. The contactless DC electric-field sensor according to claim 1, wherein the variable capacitor is a Varactor.

7. The contactless DC electric-field sensor according to claim 1, further comprising:
a 1:1 transformer disposed between the RF generator and the resonance circuit and supplying the AC power received from the RF generator to the resonance circuit.

* * * * *